United States Patent Office 2,834,774
Patented May 13, 1958

2,834,774
MANNAN TYPE GUMS

Charles A. Anker, Minneapolis, Minn., assignor to General Mills, Inc., a corporation of Delaware No Drawing. Application May 27, 1953
Serial No. 357,934

2 Claims. (Cl. 260—209)

The present invention relates to a process for improving mannan type gums to increase their viscosity and to stabilize their viscosity characteristics.

By the term "mannan type gums" as used herein is intended those polysaccharide gums which contain mannose units. The gums may contain only mannose units, but usually contain mannose units in conjunction with other sugar units such as galactose and glucose, to form galactomannan and glucomannan gums. Typical gums include guar, locust or carob bean, honey locust, ilesmannan, flame tree, tara, kanyaku, paloverde and others. These gums are usually used for their viscosity producing characteristics to thicken or stabilize various aqueous materials.

It has been known that when mannan type gums are dispersed in an aqueous medium, as they usually are before use, that the sol thus produced has an appreciable viscosity. However, this viscosity decreased with the age of the sol. For example, a freshly made sol of a guar gum at 1% concentration may have a viscosity of 100 on a MacMichael scale, using a No. 30 wire. This same sol after standing approximately 24 hours at room temperature has been reduced in viscosity to about 24. Consequently it is found that these sols should be prepared immediately before use, and that it is not desirable to prepare a sol and allow it to stand for any extended period of time.

The gums also tend to be off white in color, have a beany odor, and a poor flavor.

It has now been discovered that when these gums are extracted with lower aliphatic alcohols the viscosity produced by the residual gums is higher and in addition sols produced from the residual material are much more stable and do not decrease in viscosity appreciably over extended periods of time. In addition to this benefit to viscosity, color is improved, and odor and poor flavor are decreased.

It is, therefore, an object of the present invention to provide a novel process of treating mannan gums involving extraction with lower aliphatic alcohols.

The process may be applied to any of the above mentioned gums in a variety of forms. They may be treated in their natural form as beans, grains or seeds, but in order to speed up the extraction, the gum material is preferably reduced to a finely divided form. The particle size of the gums at the time of extraction is not critical and any suitable particle size which will permit easy access of the solvent to the individual particles and easy draining of the solvent from the particles is suitable.

For the extraction any of the lower aliphatic alcohols, methyl, ethyl, isopropyl, butyl and the like may be used. In view of its ready availability and its desirable solvent characteristics, methanol is the preferred alcohol. These alcohols may be anhydrous or may be aqueous solutions containing at least 50% and preferably 75% of alcohol by volume. The quantity of alcohol, likewise, is not critical, and any quantity which will substantially completely remove the alcohol soluble materials may be used. The alcohol content of the solution must, for practicability, be sufficiently high to prevent gelling of the gum. The extraction may be conducted at room temperature or at any elevated temperature, preferably not exceeding the boiling point of the alcohol. Many extractions are conducted at approximately reflux temperature, and accordingly this temperature is preferred.

Example 1

Guar seed was split and the endosperm separated. The remainder of the guar was ground to a fine powder. 150 g. of this powder was extracted in a Soxhlet extractor with methanol until all extractable material was removed. It was found that approximately 9% of the guar powder was removed by the methanol. The remainder powder was dried and a 1% sol was prepared. A sample of this sol was centrifuged and compared with a centrifuged sample of a sol prepared from unextracted guar flour. It was found that the centrifuged sol of the extracted guar was much clearer. The main body of the 1% sol was subjected to a viscosity test with a MacMichael viscosimeter using a No. 30 wire. These tests were run over a period of 24 hours and compared with the viscosity characteristics of a similar sol prepared from a similar gum which had not been subjected to the methanol extraction. The results are given in the following table:

| Time | Viscosity of Methanol-Extracted Guar | Time | Viscosity of Unextracted Guar |
|---|---|---|---|
| 1 hr | 149 | 40 mins | 96 |
| 2 hrs | 164 | 2 hrs | 74 |
| 4 hrs | 171 | 4 hrs | 54 |
| 6 hrs | 165 | 7 hrs | 41 |
| 24 hrs | 155 | 23 hrs | 24 |

Example 2

A series of batch extractions were carried out in which the guar flour was subjected to extraction by means of the various alcohols listed in the table below under reflux conditions. The guar samples employed were different in many cases, and accordingly a control sample is listed for each different product tested. The results are given in the following table:

| Sample and Treatment | Viscosity of a 1% sol, c. p. s. |
|---|---|
| 1. Control | 7,780 |
| 2. 1-extracted with 85% methanol | 13,250 |
| 3. Control | 2,500 |
| 4. 3-extracted with 85% methanol | 3,520 |
| 5. 3-extracted with 50% methanol | 3,250 |
| 6. 3-extracted with 75% methanol | 4,100 |
| 7. 3-extracted with 85% methanol | 3,980–4,410 |
| 8. 3-extracted with 100% methanol | 4,289 |
| 9. Control | 3,460 |
| 10. 9-extracted with 85% methanol | 12,900 |
| 11. 9-extracted with 100% methanol | 8,850 |

I claim as my invention:

1. Process of treating guar flour to produce a guar product having increased viscosity and increased viscosity stability when made into a sol as well as improved odor, color, and flavor which comprises extracting guar flour with a solvent selected from the group consisting of anhydrous lower aliphatic alcohols containing less than 5 carbon atoms and aqueous solutions of these alcohols containing less than 50% water to remove impurities soluble in the solvent while maintaining the bulk of the guar flour in the form of a solid residue, separating the residue from the solvent which contains the dissolved impurities, and drying the residue to produce the improved guar product.

2. The process of claim 1 in which the alcohol is methanol.

References Cited in the file of this patent

Whistler et al.: Polysaccharide Chemistry, pp. 292–294 (1953).